United States Patent
Cho et al.

(10) Patent No.: US 9,769,600 B2
(45) Date of Patent: Sep. 19, 2017

(54) METHOD AND APPARATUS FOR UTILIZING CALLEE INFORMATION AND LOCATION BEFORE CALL ESTABLISHMENT

(75) Inventors: Chi-Hyun Cho, Seoul (KR); Jin-Wook Lee, Yongin-si (KR); Jin-Hyoung Kim, Hwaseong-si (KR); Young-Ki Kim, Seoul (KR); Jeong-In Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 237 days.

(21) Appl. No.: 13/570,075

(22) Filed: Aug. 8, 2012

(65) Prior Publication Data
US 2013/0041963 A1    Feb. 14, 2013

(30) Foreign Application Priority Data
Aug. 8, 2011 (KR) .................. 10-2011-0078612

(51) Int. Cl.
*G06F 15/16* (2006.01)
*H04W 4/02* (2009.01)
(Continued)

(52) U.S. Cl.
CPC .............. *H04W 4/02* (2013.01); *G06Q 10/10* (2013.01); *H04L 67/24* (2013.01); *H04L 67/28* (2013.01); *H04L 67/306* (2013.01); *H04M 3/487* (2013.01); *H04L 67/2842* (2013.01); *H04M 3/42102* (2013.01); *H04M 3/42348* (2013.01); *H04M 2203/2072* (2013.01); *H04W 12/06* (2013.01)

(58) Field of Classification Search
CPC ........ H04W 4/02; H04W 12/06; G06Q 10/10;
H04L 67/24; H04L 67/28; H04L 67/306;
H04L 67/2842; H04M 3/487; H04M
3/42102; H04M 3/42348; H04M
2203/2072
USPC ........................................... 709/206
See application file for complete search history.

(56) References Cited

U.S. PATENT DOCUMENTS 7,180,991 B2 * 2/2007 Dhara .................. H04M 1/663
379/142.01
7,330,721 B2 * 2/2008 Bhatia ............... H04M 3/42374
455/401
(Continued)

FOREIGN PATENT DOCUMENTS

KR     2004-0085449      10/2004

OTHER PUBLICATIONS

International Search Report dated Feb. 27, 2013 in connection with International Application No. PCT/KR2012/006263, 3 pages.
(Continued)

*Primary Examiner* — Bryan Lee
*Assistant Examiner* — Oluwatosin Gidado

(57) ABSTRACT

The present disclosure relates to providing user information. In a method for requesting user information of an information requesting device in a mobile communication system, the method includes selecting a callee from a user, acquiring a user identifier (ID) of the selected callee, transmitting a user information request for the selected callee and the user ID to a relay server, evaluating whether an admission message is received from the relay server, and if the admission message is received, receiving user information from the relay server.

6 Claims, 14 Drawing Sheets

(51) Int. Cl.
*H04L 29/08* (2006.01)
*G06Q 10/10* (2012.01)
*H04M 3/487* (2006.01)
*H04W 12/06* (2009.01)
*H04M 3/42* (2006.01)

(56) References Cited

U.S. PATENT DOCUMENTS

| | | | |
|---|---|---|---|
| 7,477,907 B2* | 1/2009 | Koch et al. | 455/456.2 |
| 2003/0050052 A1* | 3/2003 | Minborg et al. | 455/415 |
| 2003/0074451 A1* | 4/2003 | Parker et al. | 709/227 |
| 2003/0200268 A1* | 10/2003 | Morris | 709/206 |
| 2005/0180395 A1* | 8/2005 | Moore | H04L 29/06 370/352 |
| 2007/0263825 A1* | 11/2007 | Shah | G06Q 10/109 379/202.01 |
| 2008/0275941 A1* | 11/2008 | Shekar et al. | 709/203 |
| 2009/0328176 A1* | 12/2009 | Martin | G06F 19/322 726/7 |
| 2010/0122321 A1* | 5/2010 | Sreemanthula et al. | 726/3 |
| 2010/0144368 A1* | 6/2010 | Sullivan | H04W 4/02 455/456.2 |
| 2010/0211604 A1* | 8/2010 | Campbell | H04L 51/04 707/780 |
| 2011/0014900 A1* | 1/2011 | Gottfried | 455/415 |
| 2011/0250874 A1* | 10/2011 | Shah et al. | 455/415 |
| 2011/0295719 A1* | 12/2011 | Chen | G06Q 30/02 705/27.1 |
| 2011/0319061 A1* | 12/2011 | Schmackpfeffer et al. | 455/415 |
| 2012/0063577 A1* | 3/2012 | Foster | 379/93.02 |
| 2012/0293819 A1* | 11/2012 | Doui | H04L 63/083 358/1.13 |
| 2012/0302256 A1* | 11/2012 | Pai | H04W 4/02 455/456.2 |

OTHER PUBLICATIONS

Written Opinion of International Searching Authority dated Feb. 27, 2013 in connection with International Application No. PCT/KR2012/006263, 5 pages.

Sulata Mitra, "Policy Based Admission Control and Handoff Decision Algorithm for Next Generation All-IP Wireless Network", ICECE 2008, Dec. 20-22, 2008, pp. 594-599.

Ian D. Chakers, et al., "Perceptive Admission Control for Wireless Network Quality of Service", Elsevier, 2006, Ad Hoc Networks 5 (2007) 1129-1148, 20 pages.

Foreign Communication From a Related Counterpart Application, Korean Application No. 1020110078612, Notice of Preliminary Rejection dated Mar. 18, 2017, 15 pages.

* cited by examiner

METHOD AND APPARATUS FOR UTILIZING CALLEE INFORMATION AND LOCATION BEFORE CALL ESTABLISHMENT

CROSS-REFERENCE TO RELATED APPLICATION(S) AND CLAIM OF PRIORITY

The present application is related to and claims the benefit under 35 U.S.C. §119(a) of a Korean patent application filed in the Korean Intellectual Property Office on Aug. 8, 2011 and assigned Serial No. 10-2011-0078612, the entire disclosure of which is hereby incorporated by reference.

TECHNICAL FIELD OF THE INVENTION

The present disclosure relates to a method and apparatus for recognizing a callee status by acquiring callee (or call recipient) information and location before call establishment.

BACKGROUND OF THE INVENTION

There are various methods for reporting user information of a callee when making a call by using a portable terminal.

As a first example, there is a method which has a Facebook phone function for displaying a recent Facebook status of a callee on a screen of a portable terminal when attempting to perform an outgoing call to the callee, and which provides user information determined by the callee when attempting to perform an outgoing call to the callee.

However, when using this method, the user information of the callee can be acquired only when a caller attempts to make a call. In this situation, there is a problem in that the caller has to attempt to make a call even if the caller desires to know only a current status of the callee.

In addition, there is also a problem in that, even when personal information pre-stored in a server is provided to the callee, in order to update personal information stored in the server or a Social Network Service (SNS) site, a user has to frequently access the server or the SNS site to manage the personal information.

SUMMARY OF THE INVENTION

To address the above-discussed deficiencies of the prior art, it is a primary aspect of the present disclosure is to provide a method and apparatus for utilizing callee information and location before call establishment.

In accordance with an aspect of the present disclosure, a method of providing user information at an information providing device in a mobile communication system is provided. The method includes evaluating whether a user information request and a user identifier (ID) are received from a relay server. The method also includes determining whether to admit the user information request on the basis of the user ID, and if the user information request is admitted, transmitting an admission message and user information of the relay server.

In accordance with another aspect of the present disclosure, a method of requesting user information at an information requesting device in a mobile communication system is provided. The method includes selecting a callee from a user, acquiring a user ID of the selected callee, and transmitting a user information request for the selected user and the user ID to a relay server. The method also includes evaluating whether an admission message is received from the relay server, and if the admission message is received, receiving user information from the relay server.

In accordance with another aspect of the present disclosure, a method of operating a relay server in a mobile communication system is provided. The method includes, upon receiving a user information request and a user ID from an information requesting device, delivering the user information request and the user ID to an information providing device. The method also includes, upon receiving an admission message from the information providing device, generating a user information storage. The method further includes, upon receiving user information from the information providing device, storing the user information into the user information storage. The method still further includes transmitting the user information to the information requesting device, and releasing the user information storage.

In accordance with another aspect of the present disclosure, an information providing apparatus for providing user information in a mobile communication system is provided. The apparatus includes a modem configured to communicate with other devices. The apparatus also includes a controller configured to evaluate whether a user information request and a user ID are received from a relay server, determine whether to admit the user information request on the basis of the user ID, and if the user information request is admitted, transmit an admission message and user information of the relay server. The apparatus further includes a storage unit configured to store the user ID and the user information.

In accordance with another aspect of the present disclosure, an information requesting apparatus for requesting user information in a mobile communication system is provided. The apparatus includes a modem configured to communicate with other devices. The apparatus also includes a controller configured to select a callee from a user, acquire a user ID of the selected callee, transmit a user information request for the selected callee and the user ID to a relay server, evaluate whether an admission message is received from the relay server, and if the admission message is received, receive user information from the relay server. The apparatus further includes a storage unit configured to store the user ID and the user information.

In accordance with another aspect of the present disclosure, a relay server apparatus in a mobile communication system is provided. The apparatus includes a modem configured to communicate with other devices. The apparatus also includes a controller configured to deliver the user information request and the user ID to an information providing device upon receiving a user information request and a user ID from an information requesting device, generate a user information storage upon receiving an admission message from the information providing device, store the user information into the user information storage upon receiving user information from the information providing device, transmit the user information to the information requesting device, and release the user information storage. The apparatus further includes a storage unit configured to store the user information.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

Hereinafter, a method and apparatus for utilizing callee information and location before call establishment will be described.

With the rapid growth of Internet access using a portable terminal, new value added applications have been created such as mobile banking, mobile offices, and the like. In particular, if these applications are applied to typical telephony functions of the portable terminal, the applications may have a broader effect and a greater influence.

The present disclosure is provided to easily acquire user information that can be helpful when performing an outgoing call to a callee by confirming a current location of the callee, whether the callee is available for the call, a schedule of the callee, personal information of the callee, etc., before a user performs an outgoing call by using a portable terminal.

For example, when the call is not available because the callee is in a business meeting or the like, the present disclosure can predict a next time at which a caller can make a call without interfering the callee by directly recognizing that the call is not available. The callee can show promotions, advertisements, or the like of the callee during the call and thus can use the present disclosure as a means for personal advertisements.

In the present disclosure, the user information is provided by a user terminal (i.e., a portable terminal) and is delivered to the callee by using a relay server.

The present disclosure can report a location of a portable terminal of a user to a callee by using a cell identifier (ID) of a Base Station (BS) or a Global Positioning System (GPS), and can store personal information (e.g., a photo, a profile, and the like) into the portable terminal and thus can configure information desired to be shown by the callee according to a user's preference. In addition, the present disclosure can report a current status of the user on the basis of schedule information previously input by an individual user by using a schedule management program.

Figure 1:
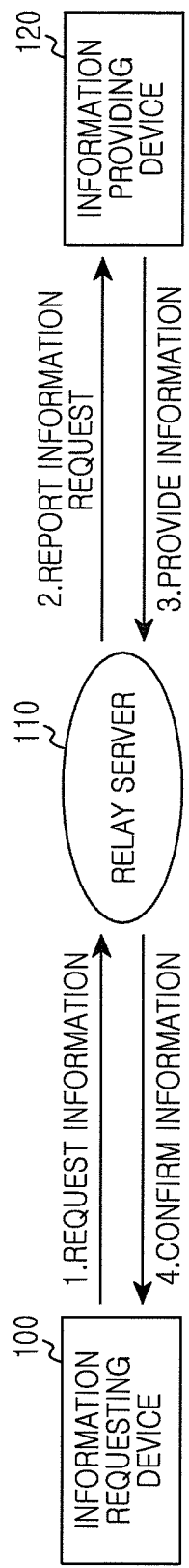
FIG. 1 illustrates a structure of a system for providing user information according to an embodiment of the present disclosure.

FIG. 1 illustrates a structure of a system for providing user information according to an embodiment of the present disclosure.

Referring to FIG. 1, the system for providing user information includes an information requesting device 100, a relay server 110, and an information providing device 120. Although it is assumed herein that the information requesting device 100 and the information providing device 120 are portable terminals, any device can be used as long as it can transmit and receive information to be exchanged.

The information requesting device 100 transmits a user identifier (ID) (i.e., a phone number, a Social Network Service (SNS) ID, an e-mail, a social security number, a bank account, and the like) of the information providing device 120 and an information request message to the relay server 110 (Operation 1). Further, in order to protect and manage personal information, a user ID of the information requesting device 100 is also transmitted to the relay server 110.

The relay server 110 transmits the information request message together with the user ID of the information requesting device 100 to the information providing device 120 (Operation 2). The user ID can be pre-registered to the relay server 110.

The information providing device 120 evaluates the user ID of the information requesting device 100 to determine whether to provide user information.

If the information providing device 120 determines to provide the user information, the information providing device 120 transmits request information of the information requesting device 100 to the relay server 110 (Operation 3).

Thereafter, the information requesting device 100 receives information requested from the relay server 110 (Operation 4), and then displays the received information.

In the present disclosure, the information delivered to the information requesting device 100 is provided from the information providing device 120. Examples of the provided information include location information and user information.

The location information is information regarding a current location of the information providing device 120 by using a cell ID of a BS or a GPS. The user information is information which is stored and configured in the information providing device 120. The user information is managed by the information providing device 120. Examples of the user information include schedules, photos, setup messages, and the like.

Figure 2:
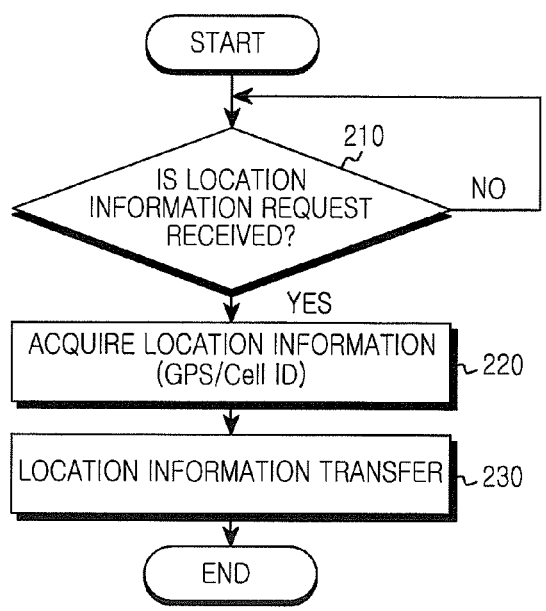
FIG. 2 is a flowchart illustrating a process of providing location information of an information providing device according to an embodiment of the present disclosure.

FIG. 2 is a flowchart illustrating a process of providing location information of an information providing device according to an embodiment of the present disclosure.

Referring to FIG. 2, when the information providing device receives a location information request from an information requesting device via a relay server (Block 210), a current location is determined on the basis of GPS information of the information providing device or a cell ID of a BS (Block 220).

The information providing device transmits information regarding the determined location to the relay server (Block 230).

Thereafter, the relay server transmits the location information to the information requesting device. Upon receiving the location information, the information requesting device displays a location of the information providing device by using the location information.

If the information requesting device is a device which is allowed to provide information, the information providing device transmits the location information to the relay server.

Figure 3:
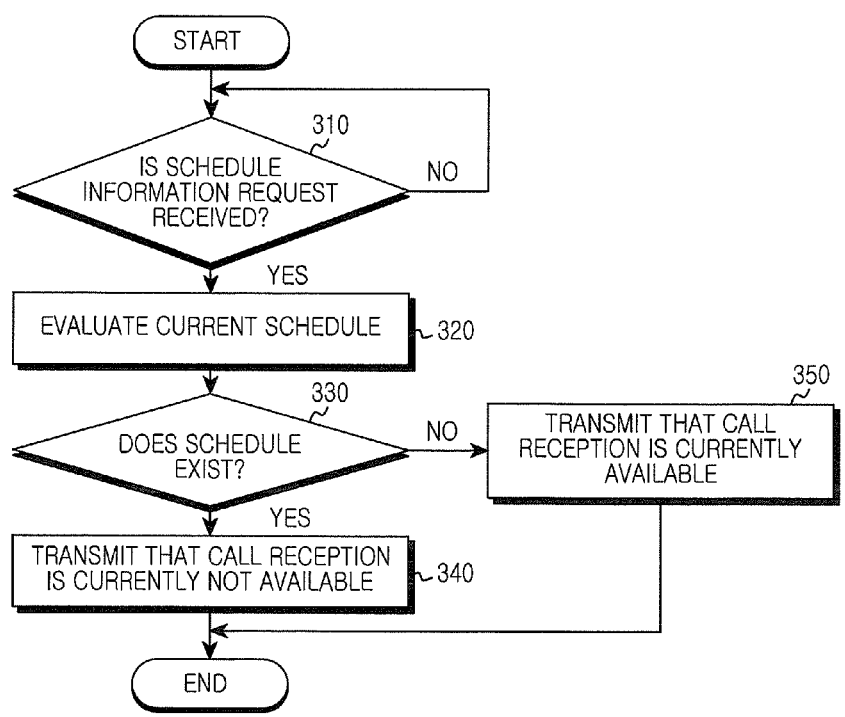
FIG. 3 is a flowchart illustrating a process of providing schedule information of an information providing device according to an embodiment of the present disclosure.

FIG. 3 is a flowchart illustrating a process of providing schedule information of an information providing device according to an embodiment of the present disclosure.

Referring to FIG. 3, when the information providing device receives a schedule information request from an information requesting device via a relay server (Block 310), the information providing device evaluates a currently stored schedule (Block 320).

When evaluating the schedule, a user's schedule (e.g., a date, a time, a place, a content, and the like) is evaluated, and it is confirmed whether the user's schedule exists at a current time.

If the user's schedule exists at the current time (Block 330), the information providing device transmits to the relay server that call reception is currently not available (Block 340). That is, it is reported that a current status is a not-available status.

If the user's schedule does not exist at the current time (Block 330), the information providing device transmits to the relay server that call reception is currently available (Block 350).

If the information providing device reports the current status, a message including the current status can be transmitted.

Alternatively, the information providing device interworks with a schedule management system used by a user and thus can evaluate a current schedule when a schedule information request occurs and can deliver a result of the evaluation to the relay server.

Upon receiving the information request, the information providing device can transmit to the relay server a photo configured by the user among photos stored in the information providing device.

In addition, the information providing device can store personal information (e.g., a birthday, an e-mail, a home, an office, and the like) and upon receiving the information request, can transmit the personal information to the relay server so that the personal information is delivered to the information requesting device.

In addition, upon receiving the information request, the information providing device can transmit a text message, a voice message, or the like to the relay server so that the message is transmitted to the information requesting device.

If the information requesting device is a device allowed to provide information, the information providing device transmits the aforementioned information to the relay server.

Figure 4:
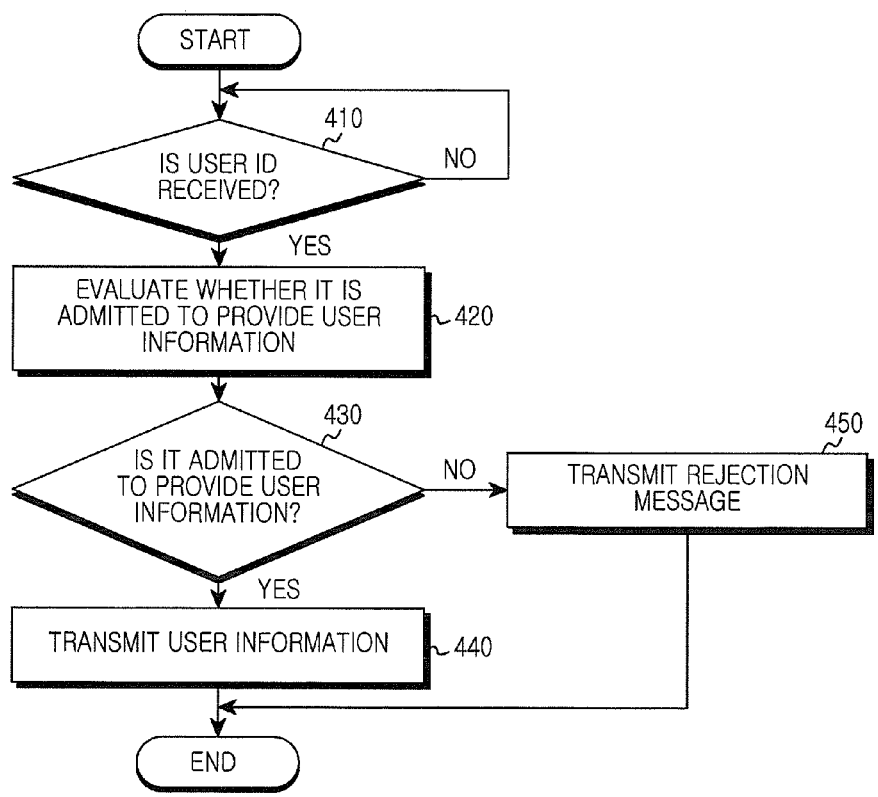
FIG. 4 is a flowchart illustrating a process of filtering a target to which an information providing device provides information according to an embodiment of the present disclosure.

FIG. 4 is a flowchart illustrating a process of filtering a target to which an information providing device provides information according to an embodiment of the present disclosure.

Referring to FIG. 4, when the information providing device receives a user ID (e.g., a phone number) of an information requesting device (Block 410), the information providing device determines whether to provide user information to the information requesting device corresponding to the user ID (Block 420). That is, whether to admit to provide the user information is determined.

If it is admitted to provide the user information (Block 430), an admission message and the user information are transmitted to a relay server (Block 440). The user information to be provided may be personal information such as location information, schedule information, a photo, a text or voice message, a birthday, an e-mail, a home, and an office, and the like.

Otherwise, if it is not admitted to provide the user information (Block 430), a rejection message is transmitted to the relay server (Block 450).

The provided user information is pre-stored in the information providing device. In addition, since the information providing device does not transmit any information to an information requesting device which is not authorized to provide information, information protection can be achieved.

The information providing device can filter a target to which information is provided by using a stored phone number. That is, the information providing device can provide user information only to a user authorized to provide information in a phone book.

When selecting a user to which information is provided, the user can provide information only to an authorized callee by using an option (e.g., non-selective admission, selective admission, and the like) in the information providing device.

As described above, the present disclosure includes the information requesting device, the information providing device, and the relay server. In a process described below, the information requesting device requests the information providing device via the relay server to send user information and location information of a user of the information providing device, and the information providing device provides the information to the information requesting device via the relay server. In this situation, the relay server performs a function for delivering information regarding request and response messages.

Figure 5:
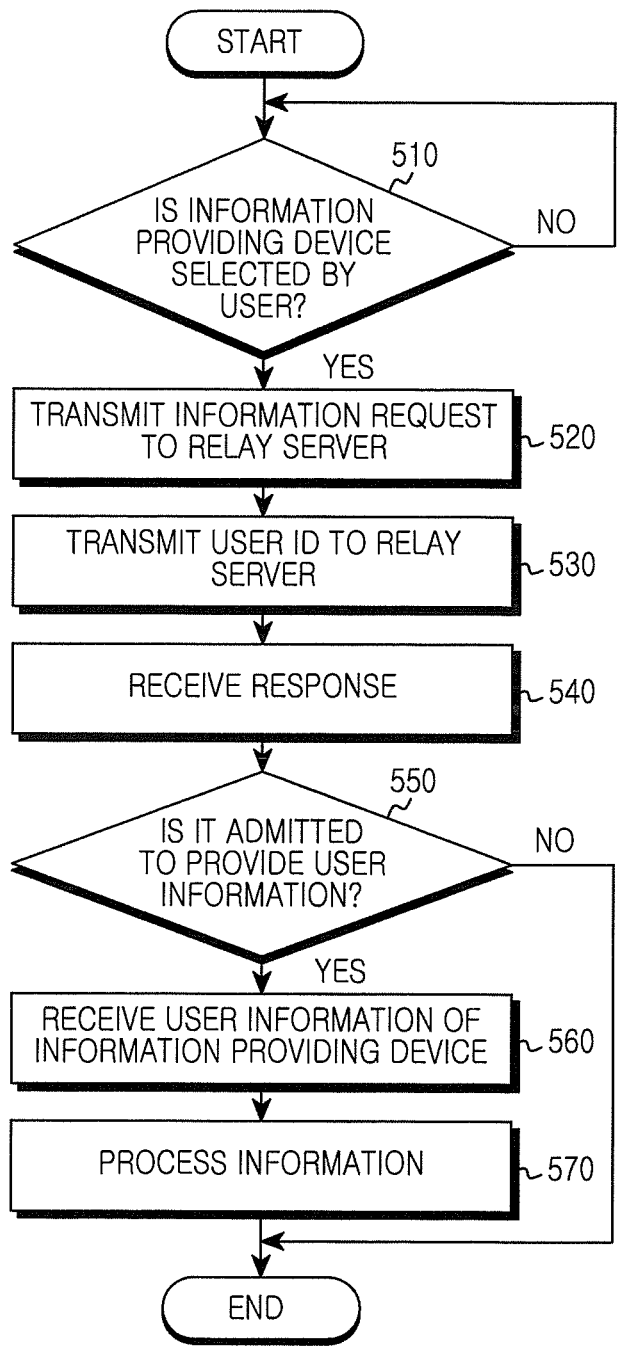
FIG. 5 is a flowchart illustrating a process of operating an information requesting device according to an embodiment of the present disclosure.

FIG. 5 is a flowchart illustrating a process of operating an information requesting device according to an embodiment of the present disclosure.

Referring to FIG. 5, when a user selects another user to request information (Block 510), the information requesting device requests an information providing device to send user information via a relay server (Block 520).

The information requesting device provides its user ID (e.g., a phone number) to the information providing device via the relay server (Block 530). The information requesting device transmits its user ID via the relay station so that the information providing device determines whether the information requesting device is an authorized device.

The information requesting device receives a response from the information providing device (Block 540). If the response indicates that it is admitted to provide the user information (Block 550), the information requesting device receives the user information of the information providing device from a storage generated in the relay server (Block 560).

The information requesting device processes the user information when necessary (Block 570). For example, the information requesting device can display the user information.

Figure 6:
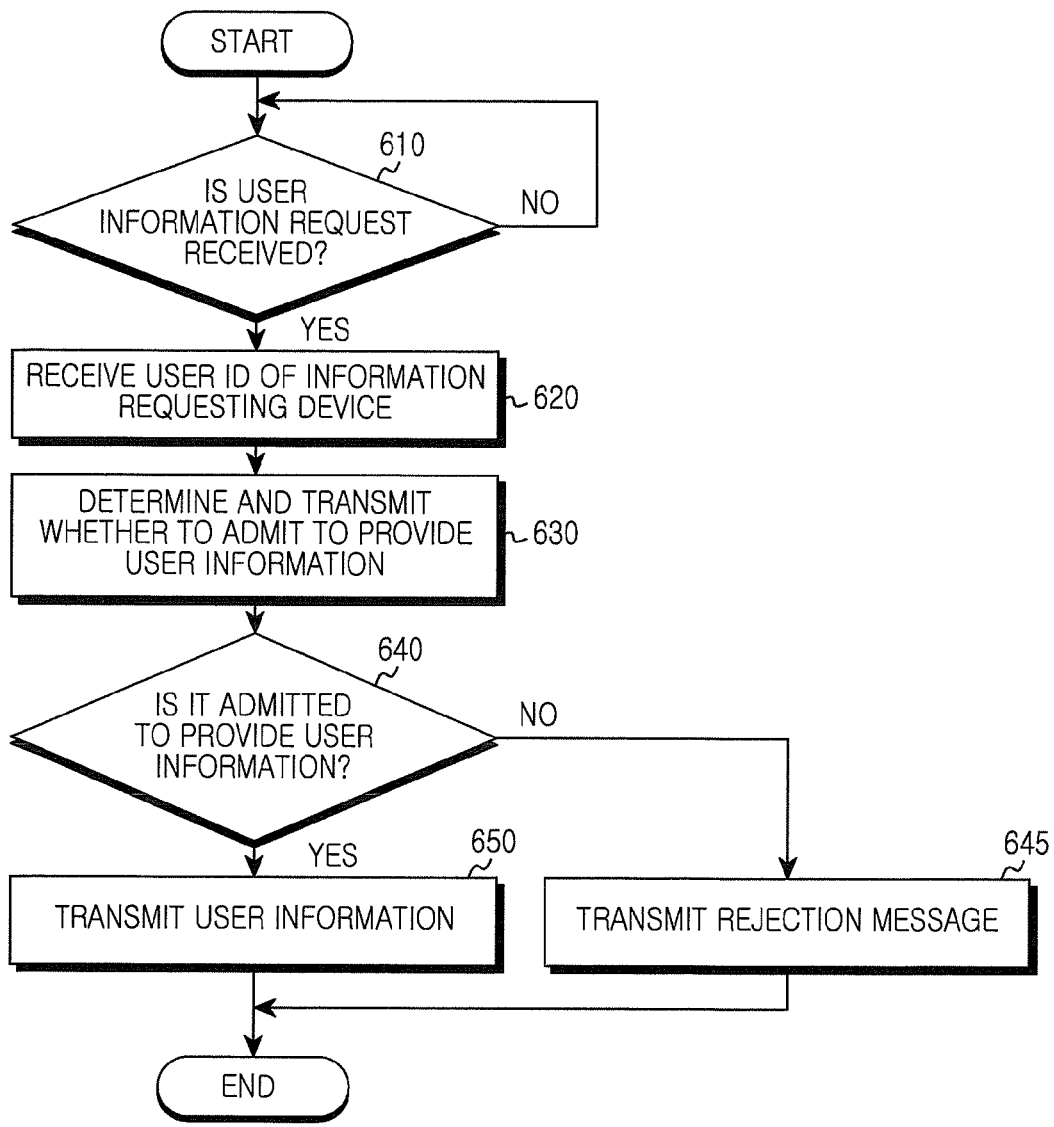
FIG. 6 is a flowchart illustrating a process of operating an information providing device according to an embodiment of the present disclosure.

FIG. 6 is a flowchart illustrating a process of operating an information providing device according to an embodiment of the present disclosure.

Referring to FIG. 6, when the information providing device receives a user information request from an information requesting device via a relay server (Block 610), the information providing device receives a user ID (e.g., a phone number) of a callee, that is, the information requesting device (Block 620). The information providing device determines whether to admit to provide user information of the information requesting device, and transmits the determination result (i.e., whether to admit to provide the user information) to the relay server (Block 630).

The information providing device receives the user ID so as to perform an information protection function by filtering whether the information requesting device is a proper target to which the user information is provided.

If it is not admitted to provide the user information (Block 640), the information providing device transmits a rejection message to the relay server (Block 645).

Otherwise, if it is admitted to provide the user information (Block 640), the information providing device transmits an admission message and user information to the relay server (Block 650).

Figure 7:
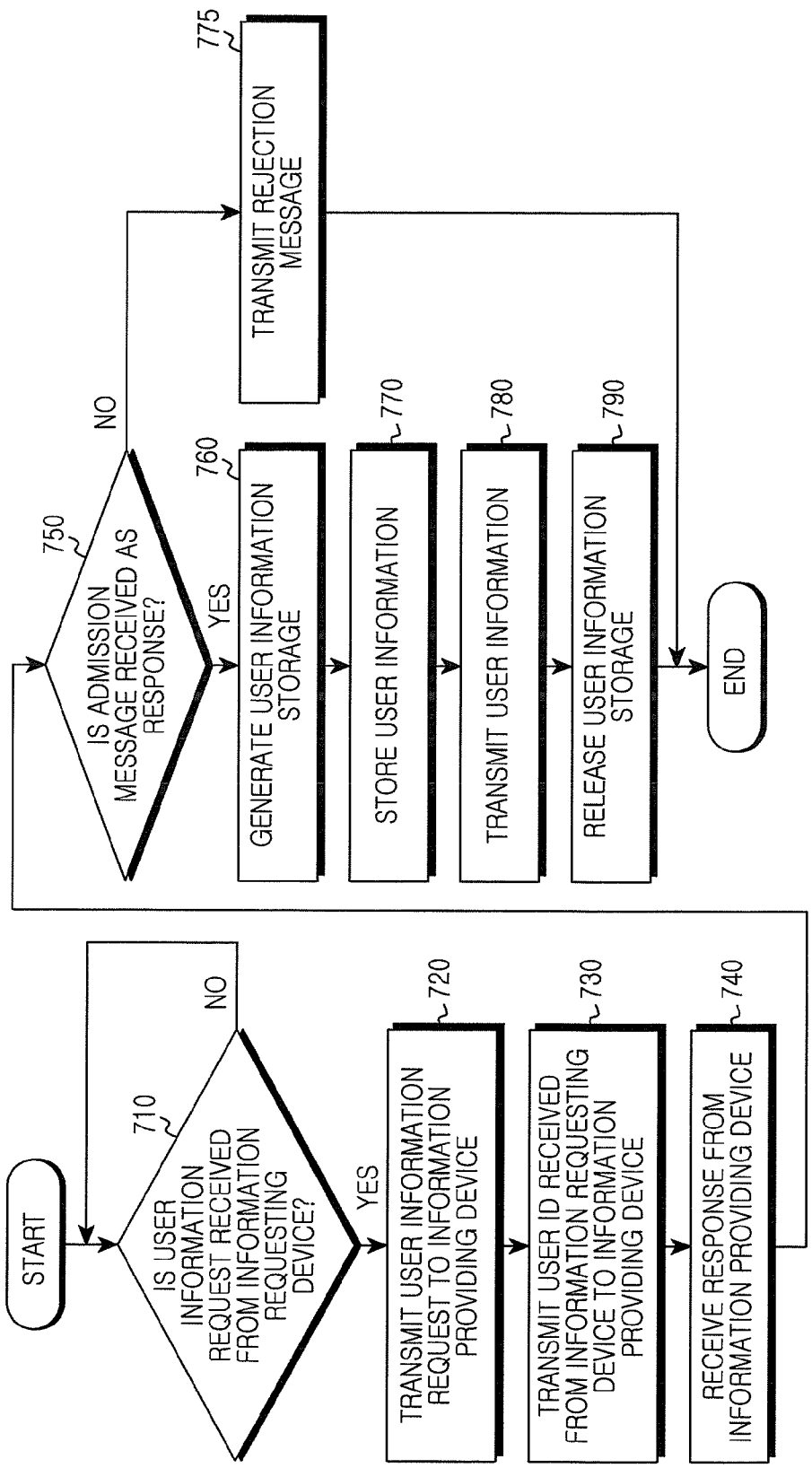
FIG. 7 is a flowchart illustrating a process of operating a relay server according to an embodiment of the present disclosure.

FIG. 7 is a flowchart illustrating a process of operating a relay server according to an embodiment of the present disclosure.

Referring to FIG. 7, when the relay server receives a user information request of an information requesting device (Block 710), the relay server transmits the user information request to the information providing device (Block 720).

The relay server receives a user ID (e.g., a phone number) of the information requesting device and transmits the user ID to the information providing device (Block 730).

The relay server receives a response for the user information requesting device from the information providing device (Block 740). The response includes whether it is admitted to provide the user information requested by the information requesting device.

If the response is an admission message (Block 750), the relay server generates a storage for storing the user information to transmit the user information to the information requesting device (Block 760).

The relay server receives the user information from the information providing device and stores the user information into the storage (Block 770).

The relay server transmits the stored user information to the information requesting device (Block 780).

The relay server releases the storage (Block 790).

If the response is not the admission message (Block 750), the relay server transmits a rejection message to the information requesting device (Block 775).

Figure 8:
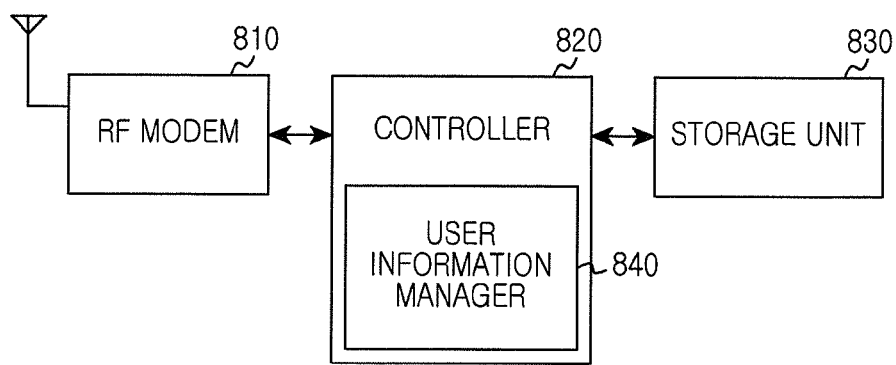
FIG. 8 is a block diagram of an information requesting device and an information providing device according to an embodiment of the present disclosure.

FIG. 8 is a block diagram of an information requesting device and an information providing device according to an embodiment of the present disclosure.

Referring to FIG. 8, the information requesting device and the information providing device include a Radio Frequency (RF) modem 810, a controller 820, a storage unit 830, and a user information manager 840. The controller 820 can control or include the user information manager 840.

The RF modem 810 is a module for communicating with other devices, and includes a wireless processor and a baseband processor. The wireless processor converts a signal received through an antenna into a baseband signal and provides the converted signal to the baseband processor. Further, the wireless processor converts the baseband signal received from the baseband processor into a wireless signal so that the signal can be transmitted on a wireless path, and then transmits the wireless signal through the antenna.

The controller 820 controls an overall operation of the information requesting device and the information providing device. In an embodiment according to the present disclosure, the controller 820 controls the user information manager 840.

The storage unit 830 performs a function for storing a program for controlling the overall operation of the information requesting device and the information providing device and temporary data generated during the program is executed. In an embodiment according to the present disclosure, the storage unit 830 stores a user ID and user information.

Now, the information requesting device will be described in detail with reference to FIG. 8. When a user selects another user to request information, the user information manager 840 requests the information providing device to send user information via a relay server.

The user information manager 840 provides its user ID a phone number) to the information providing device via the relay server. The user information manager 840 transmits its user ID via the relay station so that the information providing device determines whether the information requesting device is an authorized device.

The user information manager 840 receives a response from the information providing device. If the response indicates that it is admitted to provide the user information, the information requesting device receives the user information of the information providing device from a storage generated in the relay server.

The user information manager 840 processes the user information when necessary. For example, the user information manager 840 can display the user information.

Now, the information providing device will be described in detail with reference to FIG. 8. When the user information manager 840 receives a user information request from the information requesting device via the relay server, the user information manager 840 receives a user ID a phone number) of a callee, that is, the information requesting device, and determines whether to admit to provide user information of the information requesting device.

Thereafter, the user information manager 840 transmits the determination result, i.e., whether to admit to provide the user information, to the relay server.

The user information manager 840 receives the user ID so as to perform an information protection function by filtering whether the information requesting device is a proper target to which the user information is provided.

If it is not admitted to provide the user information, the user information manager 840 transmits a rejection message to the relay server.

Otherwise, if it is admitted to provide the user information, the user information manager 840 transmits an admission message and user information to the relay server.

The user information manager 840 can transmit location information as described above with reference to FIG. 2. In addition, the user information manager 840 can transmit to the information requesting device whether call reception is currently available according to whether a schedule is present as described above with reference to FIG. 3.

In addition, the user information manager 840 can determine whether to admit to provide user information on the basis of a user ID transmitted by the information requesting device as described above with reference to FIG. 4.

When the user information manager 840 determines whether to admit to provide user information on the basis of the user ID, if the user ID is a pre-registered user ID for the purpose of providing the user information, the user information manager 840 can determine to admit an information requesting device corresponding to the pre-registered user ID.

Figure 9:
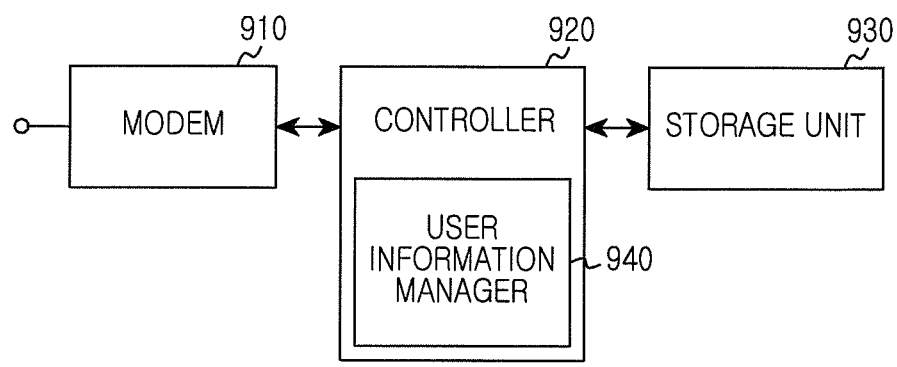
FIG. 9 is a block diagram of a relay server according to an embodiment of the present disclosure.

FIG. 9 is a block diagram of a relay server according to an embodiment of the present disclosure.

Referring to FIG. 9, the relay server includes a modem 910, a controller 920, a storage unit 930, and a user information manager 940. The controller 920 can control or include the user information manager 940.

The modem 910 is a module for communicating with other devices, and includes a wired processor and a baseband processor. The wired processor converts a signal received through a wired path into a baseband signal and provides the converted signal to the baseband processor. Further, the wired processor converts the baseband signal received from the baseband processor into a wired signal so that the signal can be transmitted on the wired path, and then transmits the wired signal through the wired path.

The controller 920 controls an overall operation of the relay server. In an embodiment according to the present disclosure, the controller 920 controls the user information manager 940.

The storage unit 930 performs a function for storing a program for controlling the overall operation of the relay server and temporary data generated during the program is executed.

In an embodiment according to the present disclosure, the storage unit 930 stores a user information storage.

Upon receiving a user information request of the information requesting device, the user information manager 940 transmits the user information request to the information providing device.

The user information manager 940 receives a user ID (e.g., a phone number) of the information requesting device and transmits the user ID to the information providing device.

The user information manager 940 receives a response for the user information requesting device from the information providing device. The response includes whether it is admitted to provide the user information requested by the information requesting device.

If the response is an admission message, the user information manager 940 generates a storage for storing the user information to transmit the user information to the information requesting device.

The user information manager 940 receives the user information from the information providing device and stores the user information into the storage.

The user information manager 940 transmits the stored user information to the information requesting device.

The user information manager 940 releases the storage.

If the response is not the admission message, the user information manager 940 transmits a rejection message to the information requesting device.

Figure 10:
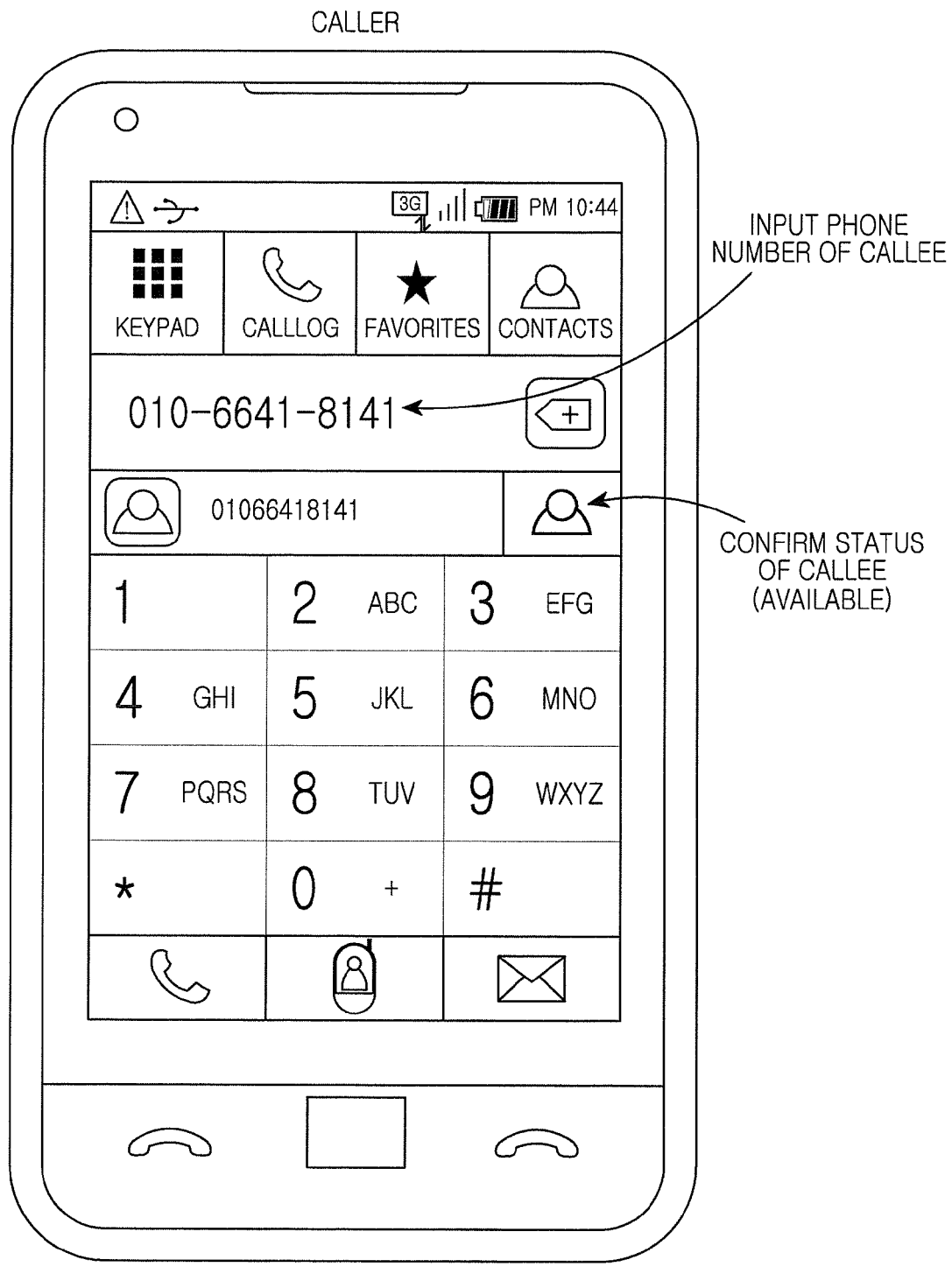
FIG. 10 illustrates a situation where a user selects a callee to whom the user desires to establish a call by using a phone book of an information requesting device according to an embodiment of the present disclosure.

FIG. 10 illustrates a situation where a user selects a callee to whom the user desires to establish a call by using a phone book of an information requesting device according to an embodiment of the present disclosure.

Referring to FIG. 10, the user uses the information requesting device to select the callee to whom the user desires to establish a call by using the phonebook of the information requesting device.

If the user selects a desired callee, a current status of the callee is displayed.

In this situation, the current status of the callee can be displayed with an icon pattern in a user list of the phone book. The icon can indicate an available status, a non-available status, or the like.

The information requesting device interworks with a schedule management system, and if the user selects the callee, can display the current status by recognizing information corresponding to a current time of the user.

Figure 11:
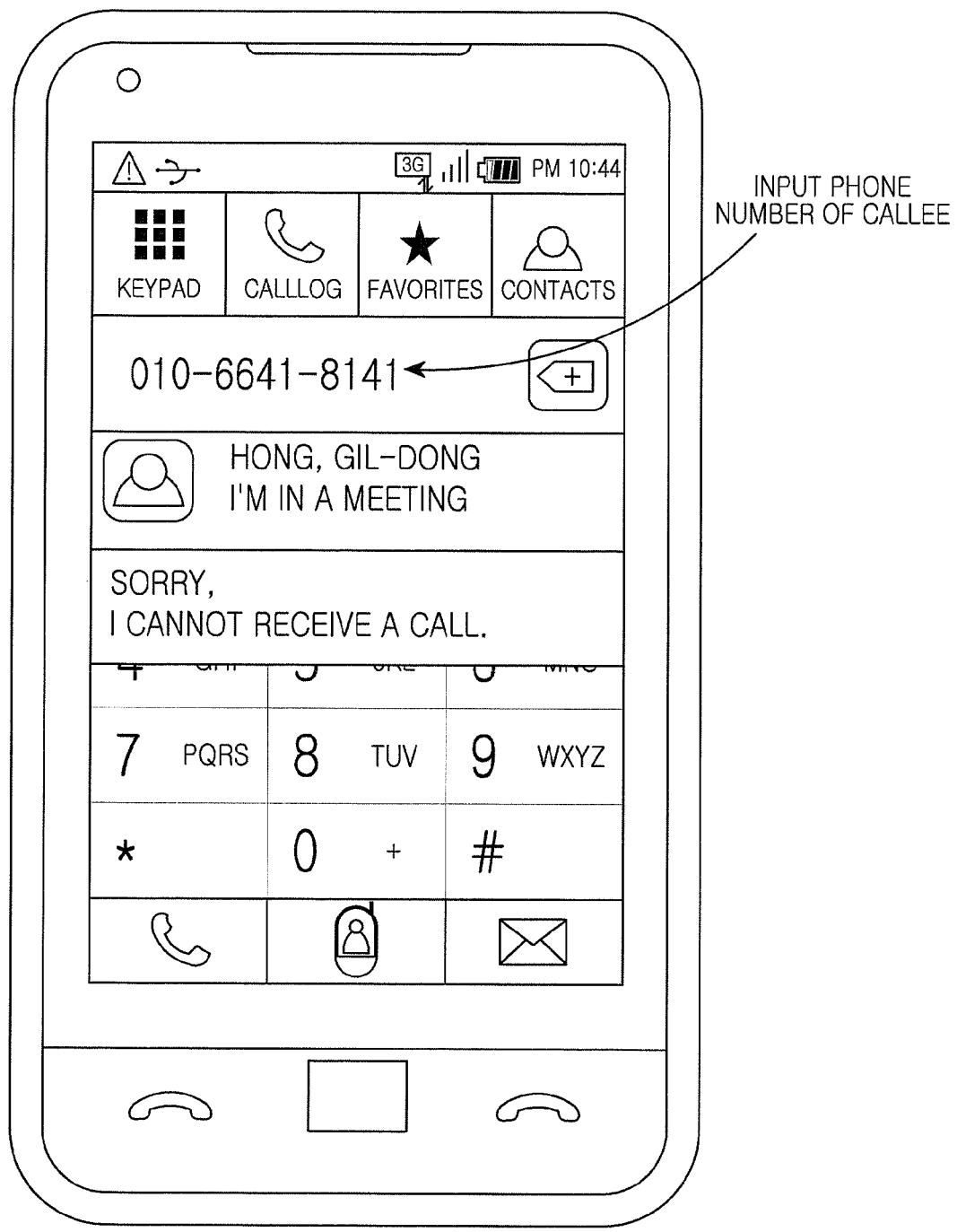
FIG. 11 illustrates an operation in which a user directly inputs a phone number by using a keypad of an information requesting device according, to an embodiment of the present disclosure.

FIG. 11 illustrates an operation in which a user directly inputs a phone number by using a keypad of an information requesting device according to an embodiment of the present disclosure.

Referring to FIG. 11, when the user inputs a phone number into the information requesting device, a name of a user corresponding to the phone number can be automatically displayed together with a status of the user.

In this situation, if a user of an information providing device pre-determines to transmit user information (e.g., a schedule, a photo, profile information, a message, and the like) to the information requesting device, the user information can be transmitted to a relay server from the information providing device, can be stored into a storage of the relay server, and then can be transmitted to the information requesting device.

Figures 12A, 12B:
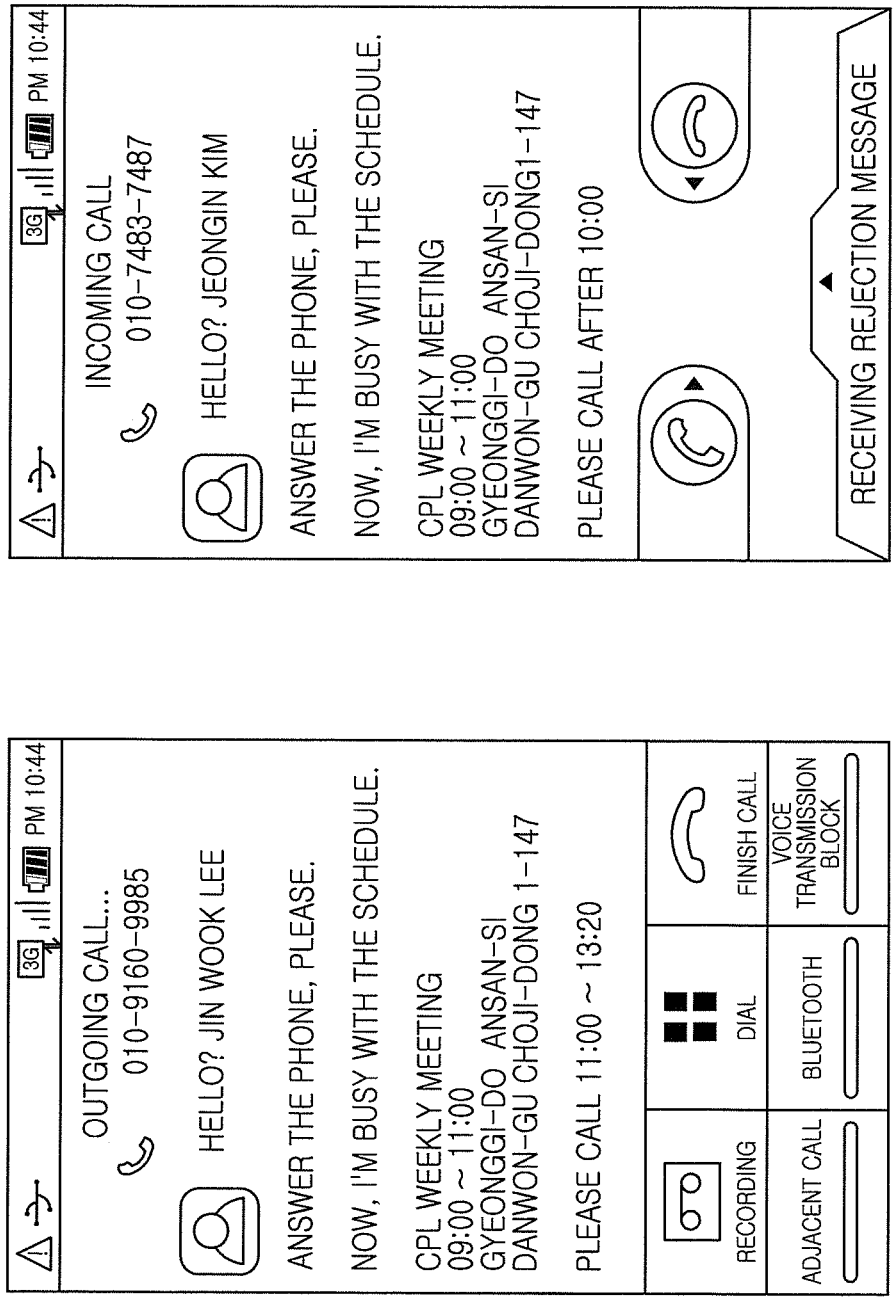
FIG. 12A illustrates an operation of displaying user information including location information in an information requesting device and an information providing device according to an embodiment of the present disclosure.
FIG. 12B illustrates an operation of displaying user information including location information in an information requesting device and an information providing device according to an embodiment of the present disclosure.

FIGS. 12A and 12B illustrate an operation of displaying user information including location information in an information requesting device and an information providing device according to an embodiment of the present disclosure.

Referring to FIGS. 12A and 12B, a display screen of the information requesting device is shown in FIG. 12A, and a display screen of the information providing device is shown in FIG. 12B.

When the information requesting device performs an outgoing call, location information of the information providing device is displayed. Further, when the information providing device performs an incoming call, location information of the information requesting device is displayed.

In this situation, the information requesting device or the information providing device can display user information and locations of all friends registered to respective phone books, or can display user information and locations of friends currently located around the information requesting device or the information providing device among all of the friends.

Figure 13:
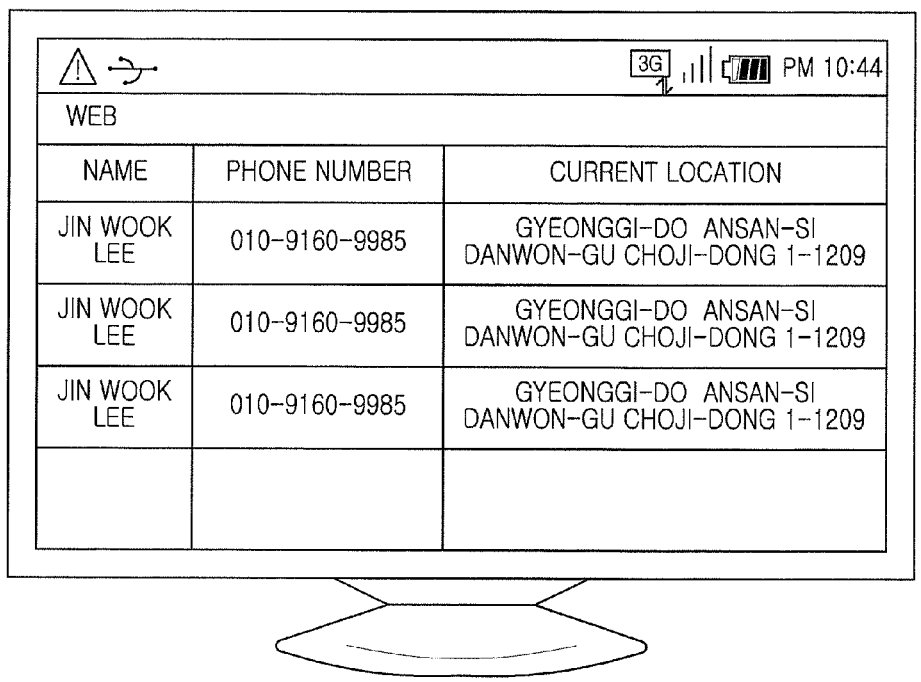
FIG. 13 illustrates an operation performed when an information requesting device or an information providing device is not a portable terminal according to an embodiment of the present disclosure.

FIG. 13 illustrates an operation performed when an information requesting device or an information providing device is not a portable terminal according to an embodiment of the present disclosure.

Referring to FIG. 13, the information requesting device or the information providing device is a television (TV) instead of a portable terminal. In this situation, a user can acquire a location, location information, and user information of a callee by using the TV.

When a family member or a friend who takes a role of the information requesting device or the information providing device is located nearby, the user can confirm the user information of the callee by using the TV.

Alternatively, the user can search the phone book from the TV, select the callee, and then acquire the user information of the callee.

When the TV can input an ID (e.g., a phone number) of the callee, the user can input the ID (e.g., the phone number) of the callee by using the TV, and can know the location and user information of the callee.

Figure 14:
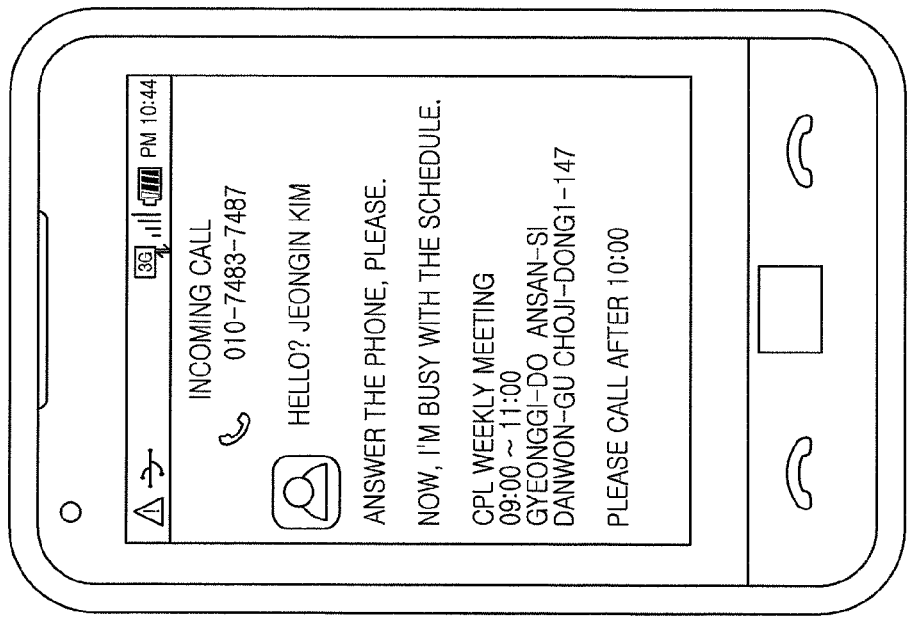
FIG. 14 illustrates an operation of delivering a voice message in an information requesting device according to an embodiment of the present disclosure.
Figure 14:
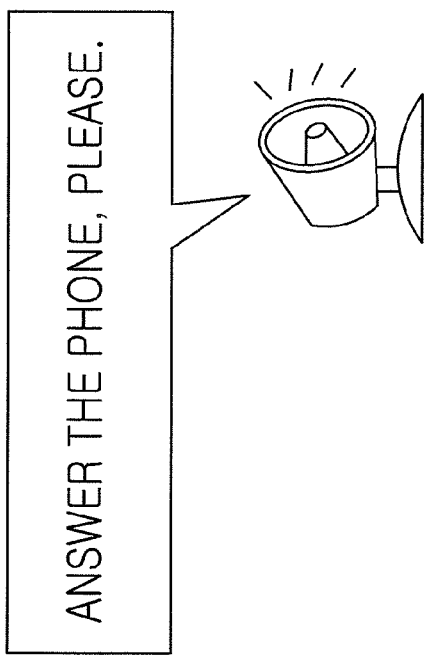

FIG. 14 illustrates an operation of delivering a voice message in an information requesting device according to an embodiment of the present disclosure.

Referring to FIG. 14, when a user of the information requesting device confirms that a user of an information providing device is currently in a non-available status, the user of the information requesting device can deliver the voice message to the information providing device and can confirm the voice message.

The present disclosure can confirm user information of a callee without a call establishment process. That is, call availability of the callee, recent personal information, or the like can be known by confirming a current status of the callee in advance without a call establishment. For example, the callee can prevent being interrupted by a call when the callee is currently in a business meeting, and information indicating when the callee is available can be known according to scheduling managed by the callee.

The present disclosure has an advantage in that a range of a device capable of requesting information can be extended. That is, the present disclosure can be used in all devices capable of sending an information request to a relay server, and unlike the conventional technique applied only to a portable terminal, the technique of the present disclosure has an advantage in that its target is extended to all devices that can access a server through the Internet.

The present disclosure can acquire the user information of the callee by transmitting an ID of the callee when current status information of the callee is requested. Further, the present disclosure has an advantage in that personal information can be conveniently updated. That is, there is an advantage in that recent information can be easily and promptly updated by providing a method of storing information desired to be shown by a user into a portable terminal of the user.

In addition, the present disclosure also has an advantage in that the user can admit or reject to provide information to a specific callee by directly applying a target filtering function to the portable terminal of the user.

It will be appreciated that embodiments of the present disclosure according to the claims and description in the specification can be realized in the form of hardware, software or a combination of hardware and software.

Any such software may be stored in a computer readable storage medium. The computer readable storage medium stores one or more programs (software modules), the one or more programs comprising instructions, which when executed by one or more processors in an electronic device, cause the electronic device to perform a method of the present disclosure.

Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like. It will be appreciated that the storage devices and storage media are embodiments of machine-readable storage that are suitable for storing a program or programs comprising instructions that, when executed, implement embodiments of the present disclosure.

Accordingly, embodiments provide a program comprising code for implementing an apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method to provide a user information in an electronic device, the method comprising:
   receive an identifier (ID) of another user and a request for the user information of a first user of the electronic device from a device of the other user through a server;
   determining whether to admit the request for the user information based on the ID of the other user;
   based on determining to admit the request for the user information, identifying, by the electronic device, a schedule of the first user of the electronic device stored in the electronic device;
   based on that the first user's schedule does not exist at a time when the request is received, transmitting, by the electronic device, an admission message indicating an available status of the first user to the device of the other user through the server; and based on the first user's schedule exists at the time when the request is received, transmitting a rejection message indicating an unavailable status of the first user to the device of the other user through the server, wherein the rejection message is transmitted without the user information by the electronic device, and the admission message is transmitted with the user information by the electronic device, wherein the user information stored in a storage of the server is transmitted from the server.

2. The method of claim 1, wherein determining whether to admit the request for the user information comprises admitting the request for the user information when the ID of the other user is a pre-set ID.

3. The method of claim 1, further comprising a second user information stored and configured in, and managed by the electronic device for enhanced security, and wherein the second user information comprises at least one of: a user location information, a photo, a text, a voice message, a birthday date, or a home address.

4. An electronic device for providing user information, the electronic device comprising:

a communication circuitry configured to communicate with one or more devices; and a controller configured to:

receive an identifier (ID) of another user and a request for the user information of a first user of the electronic device from a device of the other user through a server;

determine whether to admit the request for the user information based on the ID of the other user;

identify a schedule of the first user of the electronic device stored in the electronic device based on determining to admit the request for the user information;

control to transmit an admission message indicating an available status of the first user to the device of the other user through the server based on that the first user's schedule does not exist at a time when the request is received; and control to transmit a rejection message indicating an unavailable status of the first user to the device of the other user through the server based on that the first user's schedule exists at the time when the request is received, wherein the rejection message is transmitted without the user information, and the admission message is transmitted with the user information, wherein the user information stored in a storage of the server is transmitted from the server.

5. The electronic device of claim 4, wherein the controller is configured to admit the request for the user information when the ID of the other user is a pre-set ID.

6. The electronic device of claim 4, further comprising a second user information stored and configured in, and managed by the electronic device for enhanced security, and wherein the second user information comprises at least one of: a user location information, a photo, a text, a voice message, a birthday date, or a home address.

* * * * *